(12) United States Patent
Pasquero et al.

(10) Patent No.: US 8,884,881 B2
(45) Date of Patent: Nov. 11, 2014

(54) PORTABLE ELECTRONIC DEVICE AND METHOD OF CONTROLLING SAME

(75) Inventors: Jerome Pasquero, Montreal (CA); David Ryan Walker, Waterloo (CA); Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 175 days.

(21) Appl. No.: 13/469,626

(22) Filed: May 11, 2012

(65) Prior Publication Data

US 2013/0300665 A1 Nov. 14, 2013

(51) Int. Cl.
*G06F 3/02* (2006.01)
*G09G 5/00* (2006.01)

(52) U.S. Cl.
USPC .......................... 345/168; 345/169; 345/156

(58) Field of Classification Search
USPC ......... 715/256, 257, 259–263, 271, 705, 707, 715/708, 710, 711, 713, 714, 715, 764, 780, 715/808, 809, 810, 811, 812, 816, 825, 863, 715/864, 866; 345/168–172, 158
See application file for complete search history.

(56) References Cited

U.S. PATENT DOCUMENTS

| 5,748,512 | A | 5/1998 | Vargas |
| 6,573,844 | B1 | 6/2003 | Venolia et al. |
| 7,277,088 | B2 | 10/2007 | Robinson et al. |
| 7,508,324 | B2 | 3/2009 | Suraqui |
| 8,074,172 | B2 | 12/2011 | Kocienda et al. |
| 2006/0274051 | A1 | 12/2006 | Longe |
| 2007/0130380 | A1 | 6/2007 | Tysowski |
| 2008/0167858 | A1* | 7/2008 | Christie et al. ................. 704/10 |
| 2009/0007001 | A1 | 1/2009 | Morin et al. |
| 2011/0202876 | A1* | 8/2011 | Badger et al. ................. 715/816 |
| 2013/0125034 | A1* | 5/2013 | Griffin et al. ................. 715/773 |

FOREIGN PATENT DOCUMENTS

EP 2407859 A1 1/2012
WO 2010/112841 10/2010

OTHER PUBLICATIONS

International Application No. PCT/CA2012/050310, International Search Report dated Jan. 31, 2013.
Canadian Patent Application No. 2,821,674, Office Action Oct. 24, 2013.
European Patent Application No. 12167786.8, European Search Report dated Sep. 26, 2012.

\* cited by examiner

*Primary Examiner* — Kent Chang
*Assistant Examiner* — Nelson Rosario
(74) *Attorney, Agent, or Firm* — Alexander Anishchenko; Borden Ladner Gervais LLP

(57) ABSTRACT

A method of character entry includes detecting a spacebar adjacent input from a keyboard, the spacebar adjacent input corresponding to a key adjacent to a spacebar; and determining whether to accept the spacebar adjacent input based on whether a preceding inputted string, the preceding inputted string comprising a string of inputted characters preceding the spacebar adjacent input, corresponds to a first stored object.

15 Claims, 4 Drawing Sheets

PORTABLE ELECTRONIC DEVICE AND METHOD OF CONTROLLING SAME

FIELD OF TECHNOLOGY

The present disclosure relates to electronic devices including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and may have limited space for user input and output. The information displayed on the display may be modified depending on the functions and operations being performed.

Improvements in electronic devices with and without touch-sensitive displays are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
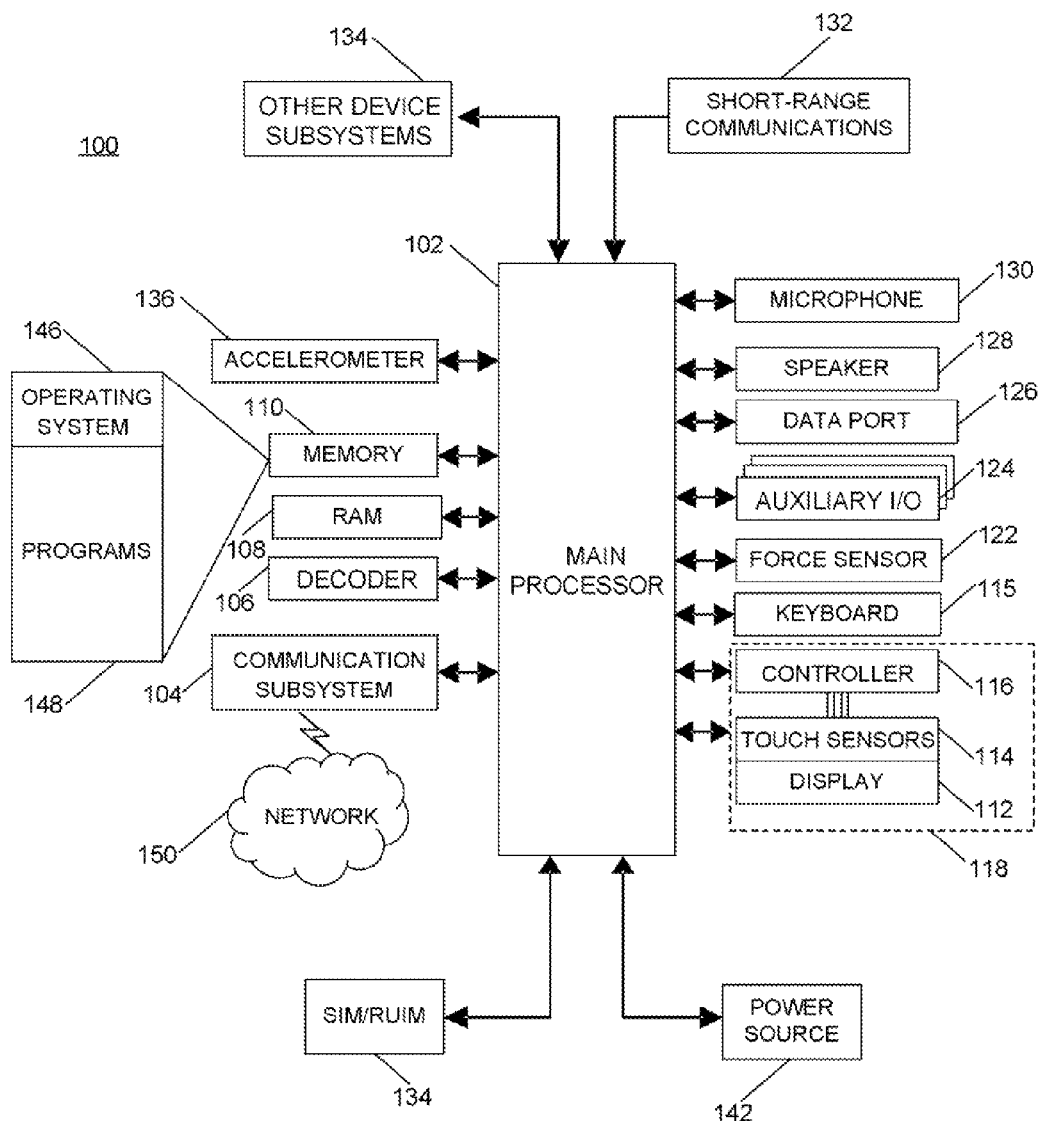
FIG. 1 is a block diagram of a portable electronic device in accordance with an example.

The following describes an electronic device and method including detecting a spacebar adjacent input from a keyboard, the spacebar adjacent input corresponding to a key adjacent to a spacebar; and determining whether to accept the spacebar adjacent input based on whether a preceding inputted string, the preceding inputted string comprising a string of inputted characters preceding the spacebar adjacent input, corresponds to a first stored object.

Various embodiments described herein relate to an electronic device and method including detecting a spacebar adjacent input from a keyboard, the spacebar adjacent input corresponding to a key adjacent to a spacebar; accepting the spacebar adjacent input when either a string of inputted characters preceding the spacebar adjacent input corresponds to a first stored object or the string of inputted characters preceding the spacebar adjacent input combined with the spacebar adjacent input corresponds to a substring of a second stored object; and replacing the spacebar adjacent input with a space when the string of the inputted characters combined with the spacebar adjacent input does not correspond to the substring of the second stored object.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. Optionally, the processor may interact with one or more force sensors 122. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Some embodiments of portable electronic device 100 include a physical keyboard 115. Some embodiments of portable electronic device 100 include a touch-sensitive display 118. Some embodiments of portable electronic device 100 include both a physical keyboard 115 and a touch-sensitive display 118. Some other embodiments of portable electronic device 100 include either a physical keyboard 115 or a touch-sensitive display 118, but not both.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information associated with a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

As mentioned above, portable electronic devices are often small and may have limited space for user input and output. Accordingly, some embodiments of portable electronic device 100 utilize a keyboard that has a layout that has been reduced in some manner, such as for example, by having a reduced number of rows. The keyboard may be any suitable keyboard such as a QWERTY keyboard, QWERTZ keyboard, AZERTY keyboard, and so forth. The keyboard includes a plurality of keys that are associated with characters that may be entered utilizing the keyboard. In some embodiments, the keyboard includes individual keys corresponding to all the alphabetic characters of a standard keyboard, such as for example, but not limited to, a QWERTY keyboard, but has a reduced number of rows. In some embodiments, the keyboard is a three-row keyboard.

Figure 2:
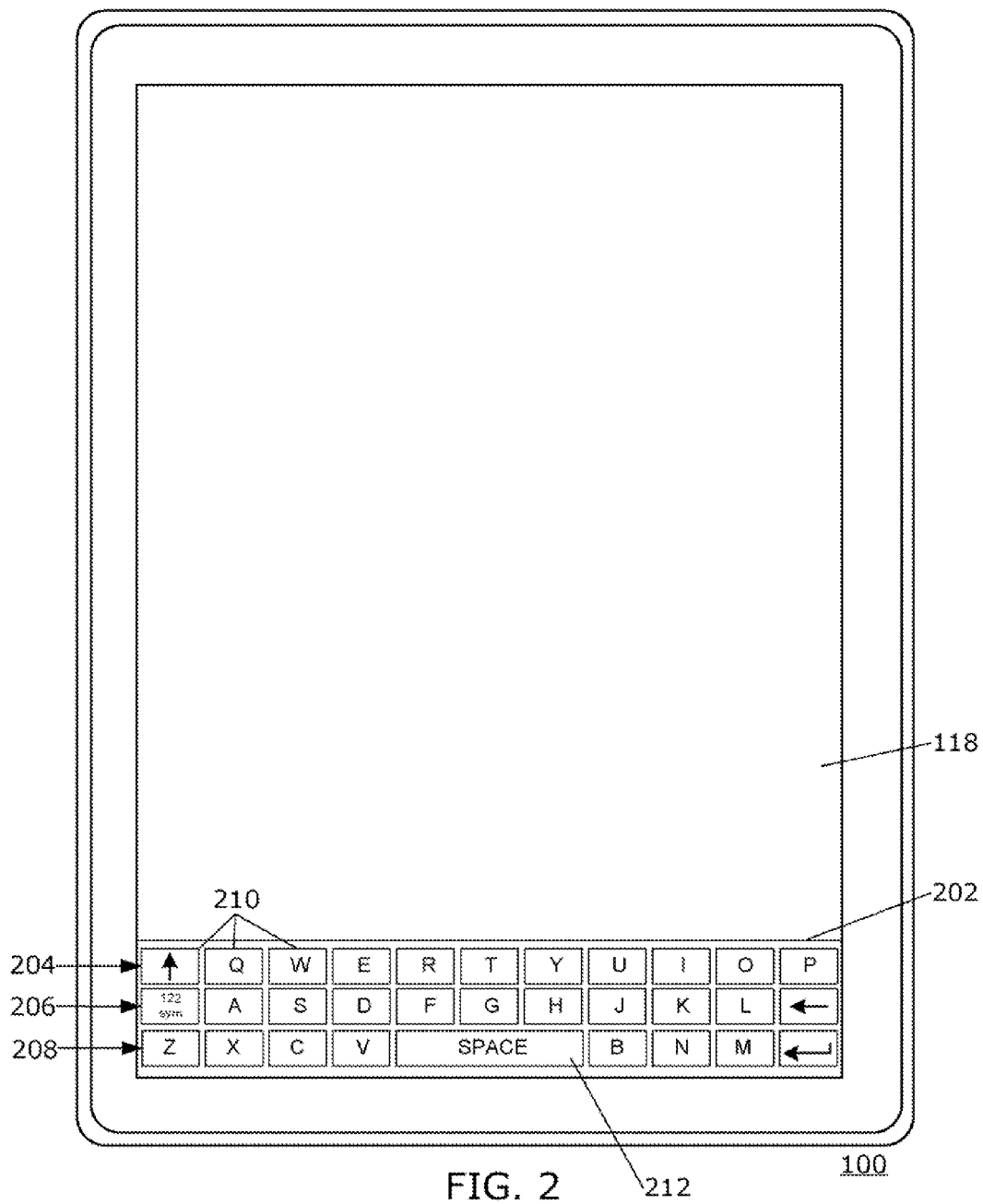
FIG. 2 is a front view illustrating a keyboard displayed on an electronic device in accordance with an example.

FIG. 2 illustrates a front view of portable electronic device displaying a virtual keyboard 202, according to an example. In the front view of FIG. 2, keyboard 202 is displayed on the touch-sensitive display 118. In the example of FIG. 2, keyboard 202 is a QWERTY keyboard and includes three rows 204, 206, 208 of keys 210. The keys 210 of the keyboard are sized such that the rows 204, 206, 208 fit the width of the touch-sensitive display 118 when the touch-sensitive display 118 is in the portrait orientation. Although FIG. 2 illustrates a virtual keyboard, in other embodiments, device 100 can include a physical keyboard with the same or similar arrangement as keyboard 202.

As can be seen from FIG. 2, keyboard 202 has a reduced sized spacebar 212. Specifically, spacebar 212 has a relatively small size relative to other keys 210 of keyboard 202 as compared with keyboards where the spacebar is on a separate (e.g. fourth) row. In example, keyboard 202, the spacebar 212 has a width of equivalent to 3 keys 210. Given the relatively small size of the spacebar 212 and its placement between keys 210 that represent other characters, it is more probable that a user may erroneously press a spacebar adjacent key instead of the spacebar when using a keyboard such as keyboard 202 as compared to a keyboard where the spacebar is larger relative to the other keys of the keyboard.

The term spacebar adjacent key refers to a key that is adjacent to the spacebar. In some embodiments, the term spacebar adjacent key refers to a key that has an a side that substantially abuts a side of the spacebar. Accordingly, in such embodiments, keys 210 of FIG. 2 corresponding to the letters "V", "F", "G", "H", and "B" are considered spacebar adjacent keys. Although FIG. 2 illustrates the spacebar adjacent keys as having a side that fully abuts spacebar 212, in some embodiments, the term spacebar adjacent key also refers to a key that has a side that only partially abuts a side of the spacebar.

In other embodiments, the term spacebar adjacent key refers to a key that shares at least a corner with the spacebar. Accordingly, in such embodiments, keys 210 of FIG. 2 corresponding to the letters "V", "D", "F", "G", "H", "J", and "B" are considered spacebar adjacent keys.

Figure 3:
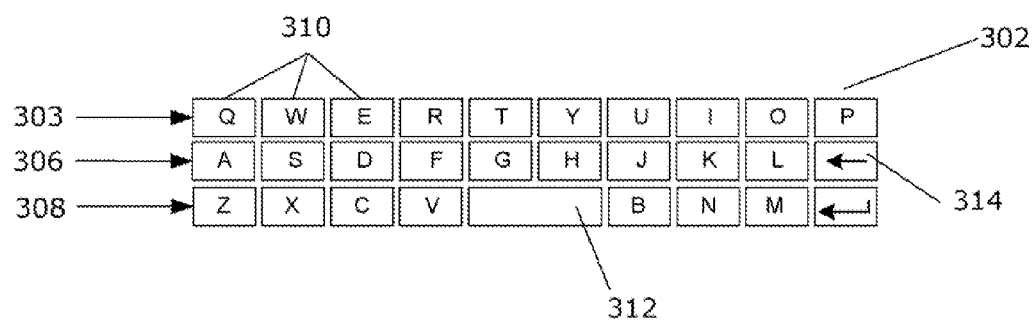
FIG. 3 is a front view illustrating a keyboard in accordance with another example.

FIG. 3 illustrates an alternative keyboard 302, according to an example. In some embodiments keyboard 302 is a physical keyboard. In other embodiments, keyboard 302 is a virtual keyboard displayed on touch-sensitive display 118 of device 100. In the example of FIG. 3, keyboard 302 is a QWERTY keyboard and includes three rows 304, 306, 308 of keys 310.

As mentioned above, in some embodiments, the term adjacent key refers to a key that has a side that substantially abuts a side of the spacebar. Accordingly, in such embodiments, keys 310 of FIG. 3 corresponding to the letters "V", "G", "H", and "B" are considered spacebar adjacent keys. Although FIG. 3 illustrates the adjacent keys as having a side that fully abuts 312, in some embodiments, the adjacent key also refers to a key that has a side that only partially abuts a side of the spacebar.

In other embodiments, the term adjacent key refers to a key that shares at least a corner with the spacebar. Accordingly, in such embodiments, keys 310 of FIG. 3 corresponding to the letters "V", "F", "G", "H", "J", and "B" are considered spacebar adjacent keys.

Figure 4:
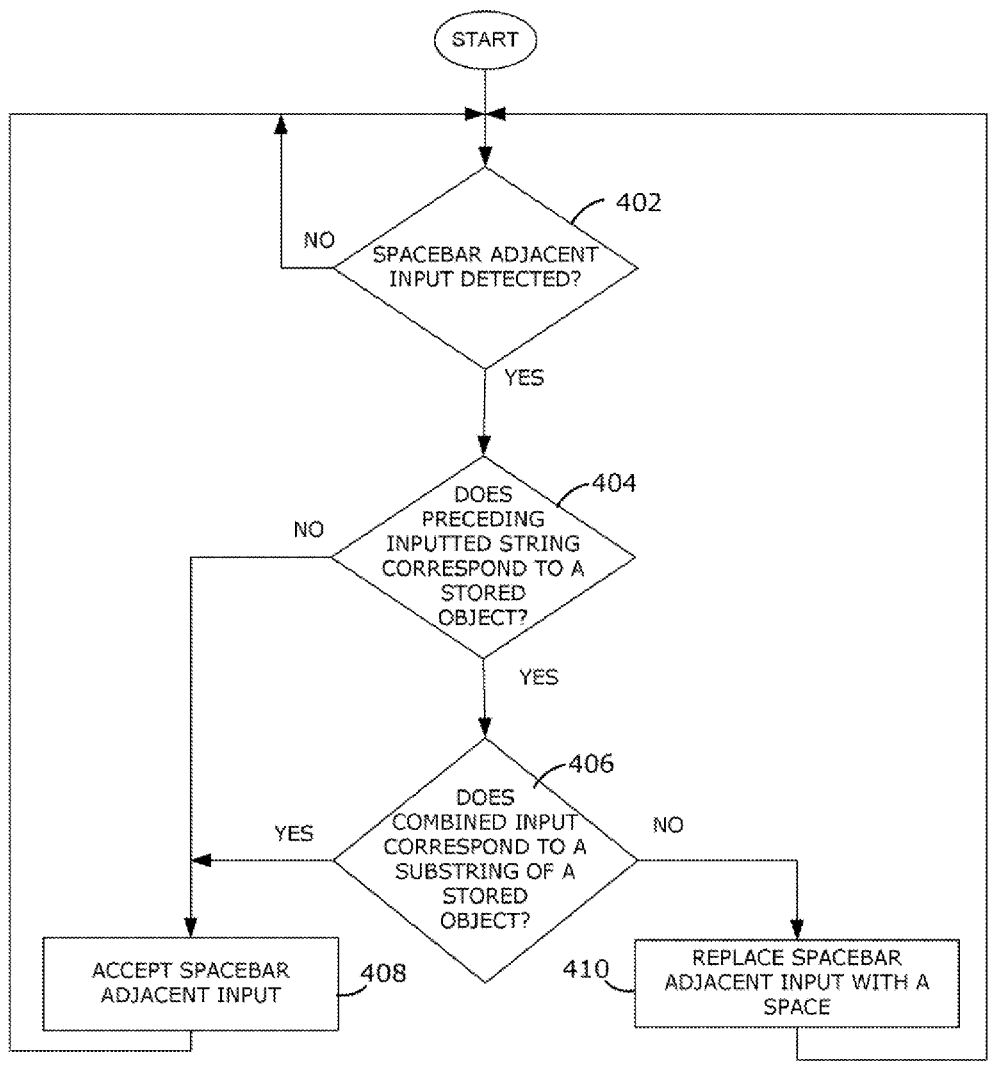
FIG. 4 is a flowchart illustrating an example of a method of character entry on an electronic device.

A flowchart illustrating an example of a method of character entry on an electronic device, such as electronic device 100, is shown in FIG. 4. The method may be carried out by software executed, for example, processor 102 and/or the controller 116. Coding of software for carrying out such a method is within the scope of a person of ordinary skill in the art given the present description. The method may contain additional or fewer processes than shown and/or described, and may be performed in a different order. Computer-readable code executable by at least one controller or processor of the portable electronic device to perform the method may be stored in a computer-readable medium, such as a non-transitory computer-readable medium.

At 402, it is determined whether a spacebar adjacent input has been detected. The term spacebar adjacent input as used herein refers to an input of a character corresponding to a spacebar adjacent key. According to some embodiments, for keyboard 302, 402 includes detecting a input corresponding to the letters "V", "F", "G", "H", "J", and "B". According to other embodiments, for keyboard 302, 402 includes detecting a input corresponding to the letters "V", "G", "H" and "B".

If a spacebar adjacent input is detected at 402, then the process continues at 404. At 404, it is determined whether a preceding inputted corresponds to a stored object. In some embodiments, the preceding inputted string refers to the string of characters that immediately precede the spacebar adjacent input. In some embodiments, the string of inputted characters preceding the spacebar adjacent input is delimited by a space. Accordingly, if the user typed out the string of characters comprising "Ted looked at a testb", then the string of inputted characters preceding the spacebar adjacent input is "test".

It should be understood that terms "preceding" and "immediately precede" do not necessarily imply a temporal relationship. In some embodiments, the terms "preceding" and "immediately precede" refer to the order of characters as they appear in a composition of characters, such as for example, a message or a document. In particular, in some embodiments, preceding characters need not have been inputted immediately prior to the spacebar adjacent input. For example, when composing an email message, a user types a portion of the email and includes the word "test" as part of that email message. The user then remembers that he or she has forgotten to type a salutation. The user then navigates to the start of the message and types a salutation. After typing the salutation the user navigates back to the end of the word "test" and proceeds to type the letter "b" (a spacebar adjacent input on keyboard 302) to form the string "testb". In some embodiments, the string "test" corresponds to a string of characters immediately preceding the spacebar adjacent input "b" even though there has been an intervening input (i.e. the salutation) from a temporal perspective.

In some embodiments, if in the example provided above the user typed the word "bed" instead of test, then proceeded to type the salutation, and then returned to the start of the word "bed" and typed "test" to form the word "testbed", then the string of characters immediately preceding the spacebar adjacent input would be "test" even though the space bar adjacent input "b" was inputted earlier in time.

The term stored object as used herein includes a stored string of characters. In some embodiments, stored objects include stored words, which can include, but are not limited to words that are stored as part of a dictionary. In some embodiments, the stored objects include strings of characters that do not necessarily form proper words. In some embodiments, the stored objects can include user selected strings of characters. The selected strings of characters can include, but are not limited to, intentional misspellings of words, user invented words, and short forms of words. In various embodiments, the string of characters are not limited to alphabetic characters but include numbers and symbols. In some embodiments, the stored objects are stored in memory 110 of electronic device 100. In other embodiments, the stored objects are stored on a separate device from electronic device 100 and is accessed through network 150. In some embodiments, the some of the stored objects are stored in memory 110 of electronic device 100 while others are stored on a separate device from electronic device 100 and are accessed through network 150.

If there is no preceding inputted string, then at 404 it is determined that the preceding inputted string does not comprise a stored object. In some embodiments, if the preceding inputted string comprises a stored object, then the process continues at 406. If the preceding input does not constitute a word, then the process continues at 408.

At 406, it is determined whether the preceding inputted string of characters combined with the spacebar adjacent input corresponds to a substring of a stored object. As used herein, the term substring refers to a part of a stored object or an entire stored object. For example, as used herein, the strings "tes" and "test" are both substrings of stored object "test". In some embodiments, this is performed by comparing the preceding inputted string of characters combined with the spacebar adjacent input against a dictionary. For example, in embodiments using the English language and where the stored objects are entries in a dictionary, if the preceding inputted string of characters was "test" and the spacebar adjacent input was "b", then in some embodiments, at 406 it would be determined that the combination "testb" constitutes a substring of at least one stored object (e.g. "testbed").

On the other hand, in an example embodiment, if the preceding inputted string of characters was "test" and the spacebar adjacent input was "v", then at 406 it would be determined that the combination "testy" does not constitute a substring of at least one word. This would be the case if, for example, there are no stored objects that start with the 5 letter sequence "testy". In some embodiments, the set of stored objects can be edited to include a string of characters that starts with the 5 letter sequence "testy" and this would result in a different result at 406 when "testy" is inputted.

If at 406 it is determined that the preceding inputted string of characters combined with the spacebar adjacent input corresponds to a substring of a stored object then the process continues at 408. Conversely, if at 406 it is determined that the preceding inputted string of characters combined with the spacebar adjacent input does not correspond to a stored object, then the process continues at 410.

At 408, the spacebar adjacent input is accepted. As can be seen from FIG. 4, if either the preceding inputted string of characters does not correspond to a stored object or if the preceding inputted string of characters combined with the spacebar adjacent input corresponds to a substring of a stored object, then the spacebar adjacent input is accepted. In some embodiments, accepting an input comprises displaying the input on the screen. Accordingly, if a user is typing a message, then at 408 the space bar adjacent input (e.g. the character corresponding to the spacebar adjacent key that was pressed by the user) would be displayed as part of the message on the screen.

At 410, the adjacent input is replaced by a space. Thus, for example, in the case where the preceding inputted string of characters is the 4 letter string "test" and the spacebar adjacent input is a letter "v", then the input that would be entered is the string "test". Accordingly, in such a situation it is determined that the user intended to input a space instead of the letter "v". Therefore, in this situation, the spacebar adjacent input is not accepted but is replaced by a space.

In some embodiments, when determining whether a spacebar adjacent input should be accepted or replaced by a space, the input following the adjacent input is also considered. The input following the adjacent input can be referred to as a "further input". In some embodiments, the further input is considered in situations where the preceding input and the adjacent input constitute a substring of a recognized word. In such a case, the adjacent input is temporarily accepted. For example, if the preceding input is "test" and the adjacent input is "b", then in some embodiments the display would display the string "testb". If the further input combined with the preceding and adjacent input still constitutes a substring of a recognized word, then the adjacent input is left unaltered. For example, if the preceding input is "test", the adjacent input is "b" and the next input is "e", then the six character string "testbe" would be entered because "testbe" is a substring of a recognized word (e.g. "testbed").

On the other hand, if the further input combined with the preceding and adjacent input no longer constitutes a substring of a word, then the adjacent input is changed to a space. For example, if the preceding input is "test", the adjacent input is "b" and the next input is "d", assuming "testbd" is not a substring of a stored object, then the six character string "test d" would be entered. In other words, in some embodiments, if a user were typing a message including these inputs, then once the user entered the letter d, the "b" would be changed to a space. In some embodiments, the further input is not considered if the further input is a space.

In various embodiments, a user can choose to undo the replacement of the spacebar adjacent input with a space. For example, the user may deliberately enter a word that is not a recognized word. In some embodiments, a user is able to undo the replacement by pressing backspace immediately after the replacement of the spacebar adjacent input with a space. For example, as discussed above, if the user enters the string "testv" on keyboard 302, then the method of FIG. 4 will replace "v" with a space such that the resulting input will be "test" instead of "testv". In some embodiments, if the user presses backspace key 314 after "testv" has been replaced by "test", then "test" will revert back to "testv". It should be understood that, in various embodiments, the user need not wait for "testv" to be replaced by "test" before pressing backspace. In other words, in some embodiments, entering the string "testv" immediately followed by backspace 314, will result in the string "testv".

In other embodiments, the user can undo the replacement of the spacebar adjacent input with the space by pressing spacebar and backspace after the entire word has been entered. For example, the user may enter the string "testvolt", which will result in "test olt" being entered because "v" will be replaced by a space as discussed above. In some embodiments, if after entering "testvolt", the user presses spacebar 312 and then backspace 314, the string "test olt" will revert back to "testvolt".

In other embodiments, pressing backspace will undo any replacement of a spacebar adjacent input between the cursor and the first space after the replaced spacebar adjacent input. For example, if the user typed "what testvol" resulting in "what test ol" and then the user pressed back space, the resulting string would appear as "what testvol" on display 118.

It should be understood that the preceding examples of how the replacement of a spacebar adjacent input with a space can be undone are not intended to be limiting. Other embodiments utilize other keys to achieve the same or similar results. For example, other embodiments utilize a key other than backspace to undo the replacement or key combinations other than spacebar and backspace.

Some embodiments of the method of FIG. 4 are directed to physical keyboards. Physical keyboards pose some challenges that are different than virtual keyboards. For example, in order to correct for possible incorrect entries on virtual keyboards, touch target areas can be remapped on virtual keyboards. In other words, with virtual keyboards, the touch target areas do not necessarily need to map exactly to the visual representations of their key counterparts. This is not the case with a physical keyboard where physically depressing a particular key will cause that key to be actuated. Accordingly, although with virtual keyboards, physically touching a visual representation of a key need not result in that key being actuated, with a physical keyboard, physically depressing a particular key will cause that key to be actuated. Physical keyboards are generally not as versatile as virtual keyboards and therefore, some embodiments described herein are directed to correcting erroneous keystrokes on physical keyboards, such as for example, a user pressing a spacebar adjacent key when the intended to press the spacebar. Some embodiments described herein are directed to correcting erroneous keystrokes on physical keyboards with a reduced number of rows, such as for example, but not limited to, three-row keyboards.

The method is not limited to the portable electronic device illustrated in the examples. The method may be applied utilizing other electronic devices. The method may also be applied to a physical and virtual keyboards. In the case of virtual keyboards, the keyboard can be displayed in any orientation, including but not limited to, a portrait or landscape orientation.

Although three row keyboards are illustrated the method may apply to any keyboard in which the spacebar is at least partially surrounded by other keys. More rows may be added to a keyboard such that additional keys may be added to increase the number of characters that may be entered utilizing the keyboard, and/or to increase the size of keys of the keyboard to facilitate selection of the keys. Alternatively, keys may be removed when the number of rows is decreased or the size of keys may be decreased.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of character entry comprising:
   detecting a spacebar adjacent input from a keyboard, the spacebar adjacent input corresponding to a key adjacent to a spacebar; and
   replacing the spacebar adjacent input with a space when both:
      a preceding inputted string comprising a string of inputted characters preceding the spacebar adjacent input, and corresponding to a first stored string of characters, and
      the preceding inputted string combined with the spacebar adjacent input does not correspond to a substring of a second stored string of characters.

2. The method of claim 1, further comprising:
   detecting a further input; and
   replacing the spacebar adjacent input with a space when both:
      the preceding inputted string combined with the spacebar adjacent input comprise a substring of the second stored string of characters, and
      the preceding inputted string combined with the spacebar adjacent input and the further input do not comprise a substring of the second stored string of characters.

3. The method of claim 1, wherein the keyboard comprises a physical keyboard.

4. The method of claim 1, wherein the key adjacent to the spacebar comprises a key having a side at least partially abutting a side of the spacebar.

5. The method of claim 1, wherein the keyboard comprises a three-row keyboard.

6. The method of claim 1, wherein the keyboard is a virtual keyboard.

7. A non-transitory computer-readable medium having computer-readable code executable by at least one processor of a portable electronic device to perform the method of claim 1.

8. An electronic device comprising:
   a keyboard, the keyboard comprising a spacebar and a plurality of keys;
   at least one processor coupled to the keyboard and configured to:
      detect a spacebar adjacent input from the keyboard, the spacebar adjacent input corresponding to a key adjacent to the spacebar; and
   replacing the spacebar adjacent input with a space when both:
      a preceding inputted string comprising a string of inputted characters preceding the spacebar adjacent input, and corresponding to a first stored string of characters, and
      the preceding inputted string combined with the spacebar adjacent input does not correspond to a substring of a second stored string of characters.

9. The electronic device of claim 8, wherein the processor is further configured to replace the spacebar adjacent input with a space when:
   the preceding inputted string corresponds to the first stored object, and
   the preceding inputted string combined with the spacebar adjacent input does not correspond to a substring of the second stored object.

10. The electronic device of claim 8, wherein the processor is further configured to:
    detect a further input; and
    replace the spacebar adjacent input with a space when both:
       the preceding inputted string combined with the spacebar adjacent input comprise a substring of the second stored string of characters, and
       the preceding inputted string combined with the spacebar adjacent input and the further input do not comprise a substring of the second stored string of characters.

11. The electronic device of claim 8, wherein the keyboard comprises a physical keyboard.

12. The electronic device of claim 8, wherein the key adjacent to the spacebar comprises a key having a side at least partially abutting a side of the spacebar.

13. The electronic device of claim 8, wherein the keyboard comprises a three-row keyboard.

14. The electronic device of claim 8, wherein keyboard is a virtual keyboard.

15. The electronic device of claim 8, further comprising a non-transitory memory, the non-transitory memory storing a set of stored strings of characters.

* * * * *